(12) United States Patent
Barry, Jr. et al.

(10) Patent No.: US 9,341,120 B2
(45) Date of Patent: May 17, 2016

(54) CHANNELED SPRING SEAL FOR SEALING AN AIR GAP BETWEEN MOVING PLATES

(75) Inventors: Thomas M. Barry, Jr., East Hampton, CT (US); Corina Scanio, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 595 days.

(21) Appl. No.: 13/371,074

(22) Filed: Feb. 10, 2012

(65) Prior Publication Data

US 2013/0341872 A1    Dec. 26, 2013

(51) Int. Cl.
F02K 1/00 (2006.01)
F02C 7/28 (2006.01)
F02K 1/80 (2006.01)

(52) U.S. Cl.
CPC . *F02C 7/28* (2013.01); *F02K 1/002* (2013.01); *F02K 1/805* (2013.01); *F05D 2240/57* (2013.01); *F05D 2250/324* (2013.01); *F05D 2250/713* (2013.01)

(58) Field of Classification Search
CPC ............. F02K 1/00; F02K 1/80; F02K 1/805; F02K 1/122; F02K 1/129
USPC .................................................. 277/650, 652
See application file for complete search history.

(56) References Cited

U.S. PATENT DOCUMENTS

| | | | |
|---|---|---|---|
| 3,972,475 A | 8/1976 | Nelson et al. | |
| 4,110,972 A | 9/1978 | Young et al. | |
| 4,575,006 A | 3/1986 | Madden | |
| 4,783,085 A | 11/1988 | Wicks et al. | |
| 5,078,412 A | 1/1992 | Baumgarth | |
| 5,115,979 A | 5/1992 | Ellerhorst et al. | |
| 5,215,257 A | 6/1993 | Barcza | |
| 5,683,034 A | 11/1997 | Johnson et al. | |
| 5,881,799 A * | 3/1999 | Kozacka et al. | 165/9 |
| 6,113,349 A * | 9/2000 | Bagepalli et al. | 415/135 |
| 6,340,286 B1 * | 1/2002 | Aksit et al. | 415/173.3 |
| 6,357,672 B1 | 3/2002 | Cowan et al. | |
| 6,966,189 B2 * | 11/2005 | Lapergue et al. | 60/771 |
| 7,757,477 B2 * | 7/2010 | Kehret et al. | 60/266 |
| 7,775,048 B2 | 8/2010 | Grammel, Jr. | |
| 7,874,160 B2 | 1/2011 | Swanson et al. | |
| 8,020,386 B2 | 9/2011 | Cowan et al. | |
| 2007/0149031 A1 | 6/2007 | Martin et al. | |
| 2008/0000236 A1 | 1/2008 | Grammel et al. | |

FOREIGN PATENT DOCUMENTS

| | | |
|---|---|---|
| EP | 0875721 | 11/1998 |
| EP | 1239118 | 5/2010 |
| WO | 2012132898 | 10/2012 |

* cited by examiner

*Primary Examiner* — Gilbert Lee
(74) *Attorney, Agent, or Firm* — O'Shea Getz P.C.

(57) ABSTRACT

A sealed joint may include a first plate with a seal land, a second plate that moves relative to the seal land, and a seal connected to the second plate. The seal may extend laterally between a first seal end and a second seal end. The seal may include a plurality of seal elements that extend longitudinally between a first seal side and a second seal side. A first of the seal elements may extend laterally from the first seal end towards a first seal segment, which is separated from the second plate by an airflow channel. The second of the seal elements may extend laterally from the second seal end towards a second seal segment, which is located between and engaged with the first seal segment and the seal land.

19 Claims, 4 Drawing Sheets

CHANNELED SPRING SEAL FOR SEALING AN AIR GAP BETWEEN MOVING PLATES

This invention was made with government support under Contract No. F33657-98-C-2004 awarded by the United States Air Force. The government may have certain rights in the invention.

CROSS-REFERENCE TO RELATED APPLICATIONS

This application is related to U.S. patent application Ser. No. 13/371,052, which is hereby incorporated by reference in its entirety, and is assigned to the assignee of the present invention.

BACKGROUND OF THE INVENTION

1. Technical Field

The present invention relates generally to a spring seal and, in particular, to a spring seal for sealing an air gap between moving plates included in, for example, a turbine engine exhaust nozzle.

2. Background Information

A thrust vectoring exhaust nozzle may include an exhaust nozzle duct faulted by an exhaust nozzle case and a plurality of convergent and divergent nozzle flaps. A seal may be arranged between each nozzle flap end and a respective exhaust nozzle case sidewall to reduce core gas leakage therebetween. Typical prior art seals, however, do not accommodate outward splaying of the exhaust nozzle case sidewalls.

SUMMARY OF THE DISCLOSURE

According to a first aspect of the invention, a sealed joint includes a first plate with a seal land, a second plate that moves relative to the seal land, and a seal connected to the second plate. The seal extends laterally between a first seal end and a second seal end. The seal includes a plurality of seal elements that extend longitudinally between a first seal side and a second seal side. A first of the seal elements extends laterally from the first seal end towards a first seal segment, which is separated from the second plate by an airflow channel. The second of the seal elements extends laterally from the second seal end towards a second seal segment, which is located between and engaged with the first seal segment and the seal land.

According to a second aspect of the invention, a seal joint includes a first plate with a seal land, a second plate that moves relative to the seal land, and a seal. The seal extends laterally between a first seal end and a second seal end, and includes a first seal element and a second seal element. The first seal element extends laterally from the first seal end to a first element end, and the second seal element extends laterally from the second seal end to a second element end. The first seal element includes a first base segment that extends laterally from the first seal end towards a first seal segment. The first base segment is connected to the second plate, and the first seal segment that is spatially separated from the second plate. The second seal element includes a second base segment that extends laterally from the second seal end towards a second seal segment. The second base segment is connected to the second plate, and the second seal segment is located between and engaged with the first seal segment and the seal land.

The foregoing features and the operation of the invention will become more apparent in light of the following description and the accompanying drawings.

DETAILED DESCRIPTION OF THE INVENTION

Figure 1:
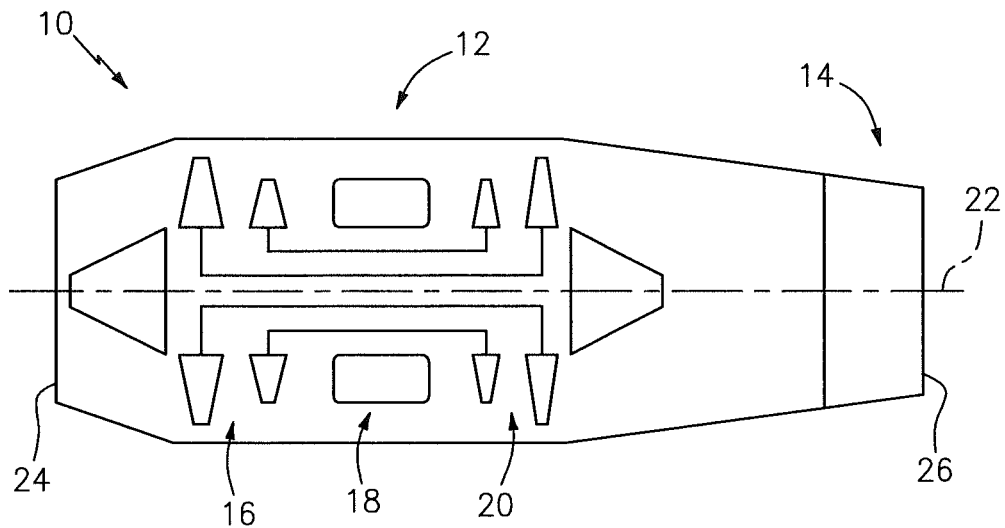
FIG. 1 is a block diagram illustration of a gas turbine engine.

FIG. 1 illustrates a gas turbine engine 10 that includes an engine core 12 and a (e.g., thrust vectoring) exhaust nozzle 14. The engine core 12 includes a compressor section 16, a combustor section 18 and a turbine section 20. The engine core 12 and the exhaust nozzle 14 are sequentially arranged along a longitudinal centerline 22 between a turbine engine inlet 24 and a turbine exhaust nozzle outlet 26.

Figure 2:
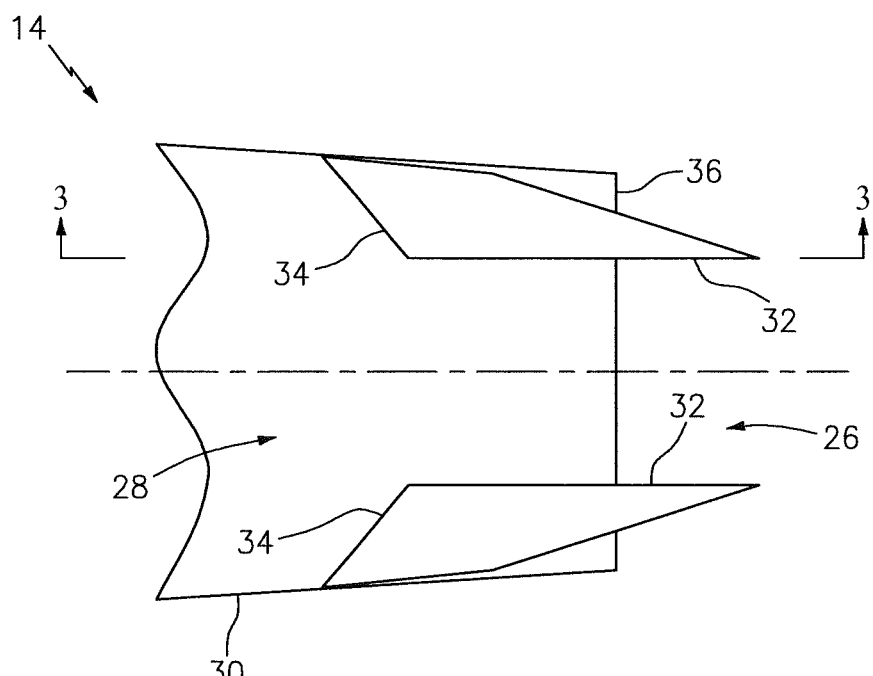
FIG. 2 is a side-view sectional illustration of a turbine engine exhaust nozzle.
Figure 3:
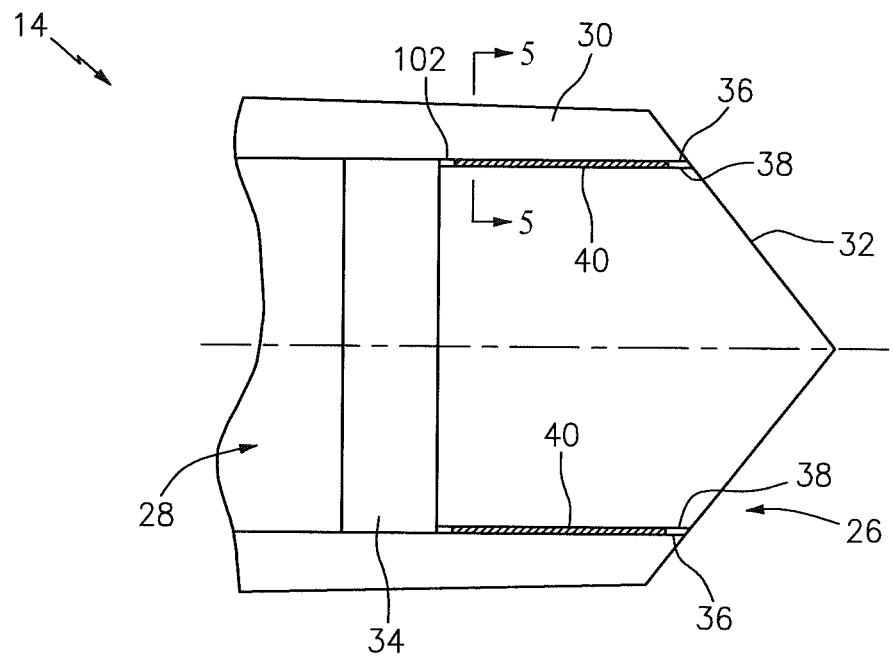
FIG. 3 is a bottom-view sectional illustration of the exhaust nozzle illustrated in FIG. 2.

Referring to FIGS. 2 and 3, the exhaust nozzle 14 includes an exhaust nozzle duct 28 formed by an exhaust nozzle case 30 and one or more exhaust nozzle flaps (e.g., 32 and 34). The exhaust nozzle case 30 includes a plurality of first plates that are configured as, for example, exhaust nozzle duct sidewalls 36. The exhaust nozzle flaps may include one or more divergent flaps 32 and one or more convergent flaps 34. Each divergent flap 32 extends transversely between a plurality of second plates that are configured as, for example, divergent flap sidewalls 38. Examples of such an exhaust nozzle configuration are disclosed in U.S. Pat. Nos. 7,874,160 and 8,020,386, which are hereby incorporated by reference in their entirety, and assigned to the assignee of the present invention. The present invention, however, is not intended to be limited to any particular exhaust nozzle configuration. Referring still to FIG. 3, the exhaust nozzle 14 also includes one or more channeled spring seals 40.

Figure 4:
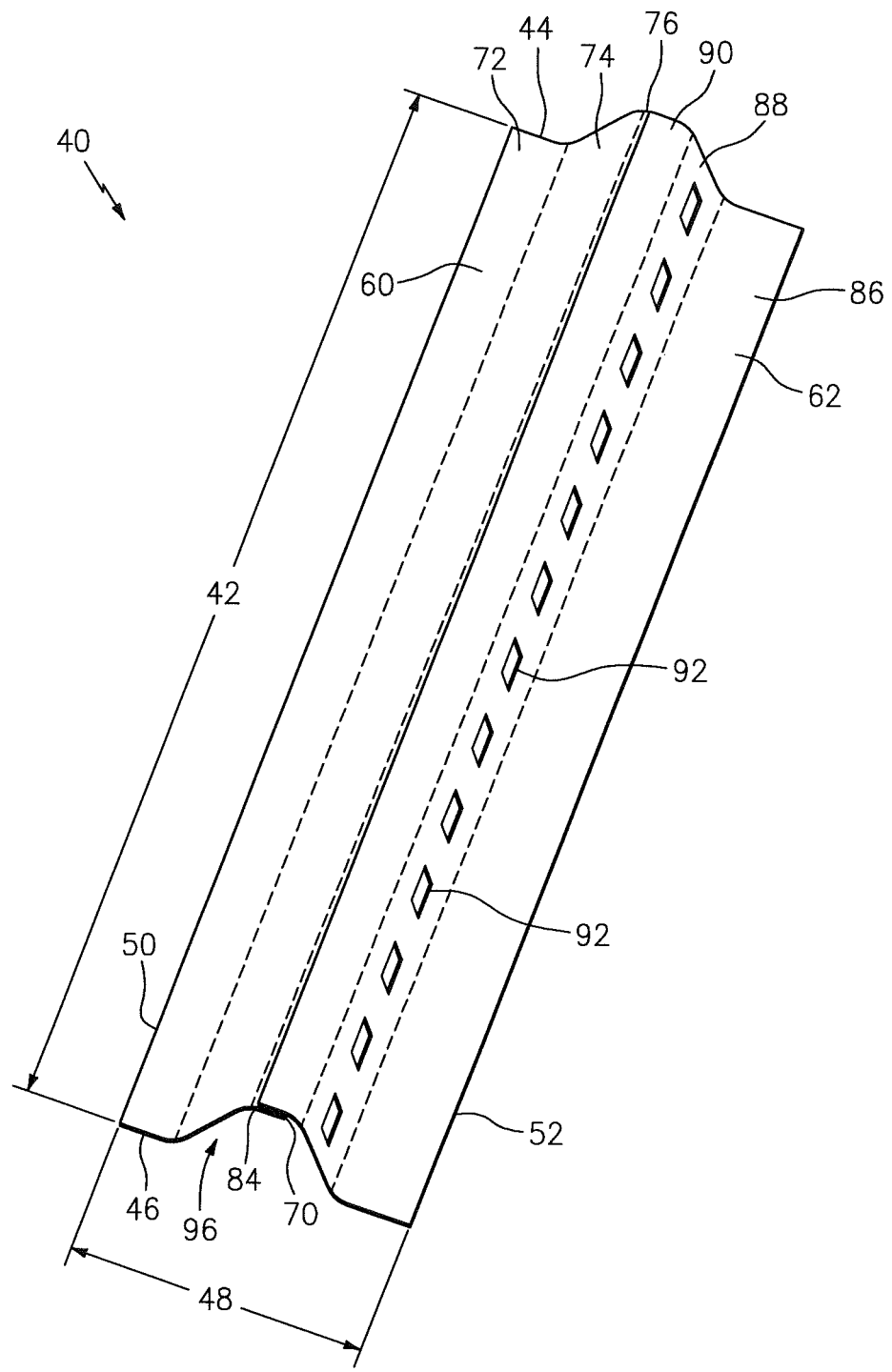
FIG. 4 is a perspective illustration of a channeled spring seal.
Figure 5:
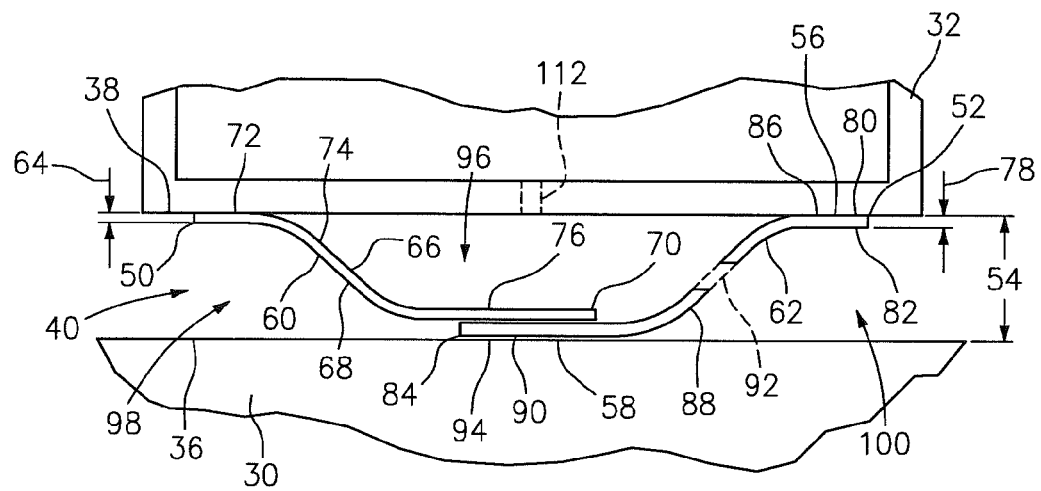
FIG. 5 is a cross-sectional illustration of a portion of the exhaust nozzle illustrated in FIG. 3.

Referring to FIG. 4, each seal 40 may have a seal length 42 that extends longitudinally between a first (e.g., forward) seal side 44 and a second (e.g., aft) seal side 46. Each seal 40 may have a seal width 48 that extends laterally between a first (e.g., radial outer) seal end 50 and a second (e.g., radial inner) seal end 52. Referring now to FIG. 5, each seal 40 may have a seal height 54 that extends transversely between a third (e.g., radial inner) seal side 56 and a fourth (e.g., radial outer) seal side 58. Each seal 40 also includes a plurality of spring seal elements such as, for example, a first seal element 60 and a second seal element 62.

The first seal element 60 has a first thickness 64 that extends transversely between a first surface 66 and a second surface 68. The first thickness 64 is less than the seal height 54. Referring to FIG. 4, the first seal element 60 extends laterally from the first seal end 50 to a distal first element end 70. The first seal element 60 may include a plurality of first seal element segments such as, for example, a first base segment 72, a first transition segment 74 and a first seal segment 76. Each of the first seal element segments (e.g., 72, 74 and 76) may extend longitudinally between the first seal side 44 and the second seal side 46. The first base segment 72 may extend laterally from the first seal end 50 to the first transition segment 74. The first transition segment 74 may extend laterally and transversely from the first base segment 72 to the first seal segment 76. The first seal segment 76 may extend laterally from the first transition segment 74 to the first element end 70.

Referring to FIG. 5, the second seal element 62 has a second thickness 78 that extends transversely between a first surface 80 and a second surface 82. The second thickness 78 is less than the seal height 54, and may be greater than the first thickness 64. Referring to FIG. 4, the second seal element 62 extends laterally from the second seal end 52 to a distal second element end 84. The second seal element 62 may include a plurality of second seal element segments such as, for example, a second base segment 86, a second transition segment 88 and a second seal segment 90. Each of the second seal element segments (e.g., 86, 88 and 90) may extend longitudinally between the first seal side 44 and the second seal side 46. The second base segment 86 may extend laterally from the second seal end 52 to the second transition segment 88. The second transition segment 88 may extend laterally and transversely from the second base segment 86 to the second seal segment 90. The second seal segment 90 may extend laterally from the second transition segment 88 to the second element end 84. The second seal element 62 may also include one or more airflow apertures 92 that extend, for example, laterally through the second transition segment 88.

Referring to FIG. 5, the first surface 66 adjacent the first seal end 50 may be engaged with (e.g., sealingly contact) the respective divergent flap sidewall 38, and the first base segment 72 may be connected (e.g., riveted, brazed, welded, etc.) to the respective divergent flap sidewall 38. The first surface 80 adjacent the second seal end 52 may be engaged with the respective divergent flap sidewall 38, and the second base segment 86 may be connected to the respective divergent flap sidewall 38. The second seal segment 90 may be located between and (e.g., slidingly) engaged with the first seal segment 76 and a seal land 94 on the respective exhaust nozzle duct sidewall 36. The second surface 68 at the first seal segment 76, for example, may be engaged with the first surface 80 at the second seal segment 90. The second surface 82 at the second seal segment 90 may be engaged with the seal land 94.

An airflow channel 96 may be formed between the first surfaces 66 and 80 and the respective divergent flap sidewall 38. The airflow channel 96, for example, may extend transversely between the respective divergent flap sidewall 38 and one or more of the first and/or second seal element segments; e.g., the first transition segment 74, the first seal segment 76, a portion of the second seal segment 90 and/or the second transition segment 88. The airflow channel 96 may extend laterally between one or more of the first seal element segments (e.g., the first base segment 72 and/or the first transition segment 74) and one or more of the second seal element segments (e.g., the second base segment 86 and/or the second transition segment 88). Referring to FIG. 4, the airflow channel 96 may also extend longitudinally between the first seal side 44 and the second seal side 46.

Referring to FIG. 5, a first air gap 98 may be formed between the second surface 68 and the respective exhaust nozzle duct sidewall 36. The first air gap 98, for example, may extend transversely between the respective exhaust nozzle duct sidewall 36 and one or more of the first seal element segments; e.g., the first base segment 72, the first transition segment 74 and/or a portion of the first seal segment 76. A second air gap 100 may be formed between the second surface 82 and the respective exhaust nozzle duct sidewall 36. The second air gap 100, for example, may extend transversely between the respective exhaust nozzle duct sidewall 36 and one or more of the second seal element segments; e.g., the second base segment 86 and/or the second transition segment 88. The second air gap 100 may be coupled to the airflow channel 96 through the airflow apertures 92.

Referring to FIG. 1, during turbine engine 10 operation, the exhaust nozzle 14 receives core gas from the engine core 12. Referring to FIGS. 2 and 3, the exhaust nozzle duct 28 directs a relatively large portion of the core gas through the turbine exhaust nozzle outlet 26 to provide engine thrust. A relatively small portion of the core gas may leak from the exhaust nozzle duct 28 into joints 102 between the exhaust nozzle duct sidewalls 36 and the divergent flap sidewalls 38.

Figure 6:
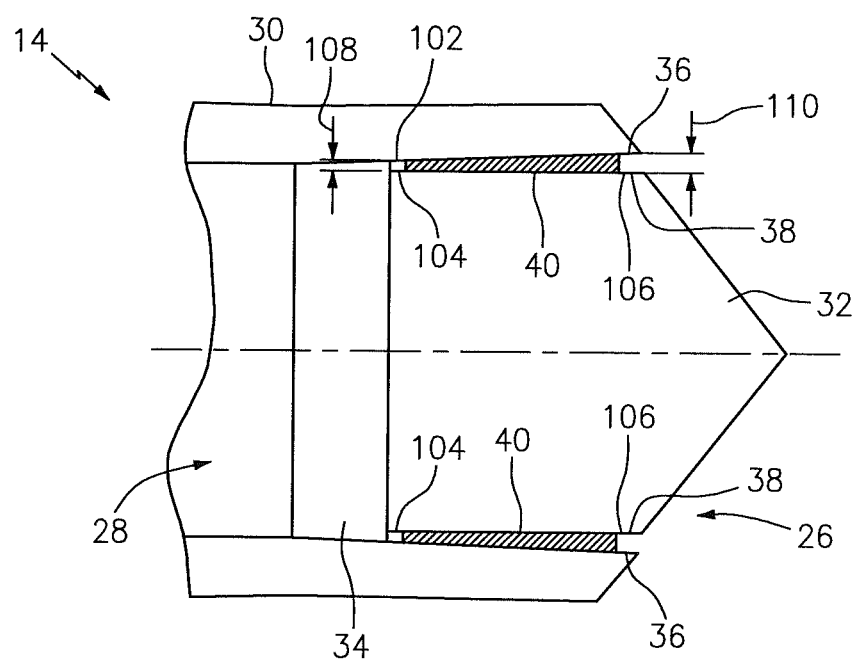
FIG. 6 is a bottom-view sectional illustration of a turbine engine exhaust nozzle during operation.

Referring to FIG. 6, during some operating conditions, the exhaust nozzle duct sidewalls 36 may (e.g., outwardly) splay apart from one another. Such splaying may non-uniformly increase displacement between each exhaust nozzle duct sidewall 36 and the respective divergent flap sidewall 38 as the exhaust nozzle 14 extends longitudinally, for example, from a first (e.g., forward) joint end 104 to a second (e.g., aft) joint end 106 at the turbine exhaust nozzle outlet 26. Each exhaust nozzle duct sidewall 36 and the respective divergent flap sidewall 38, for example, may be separated by (i) a first displacement 108 at the first joint end 104, and (ii) a second displacement 110 at the second joint end 106 that is greater than the first displacement 108.

Figure 7:
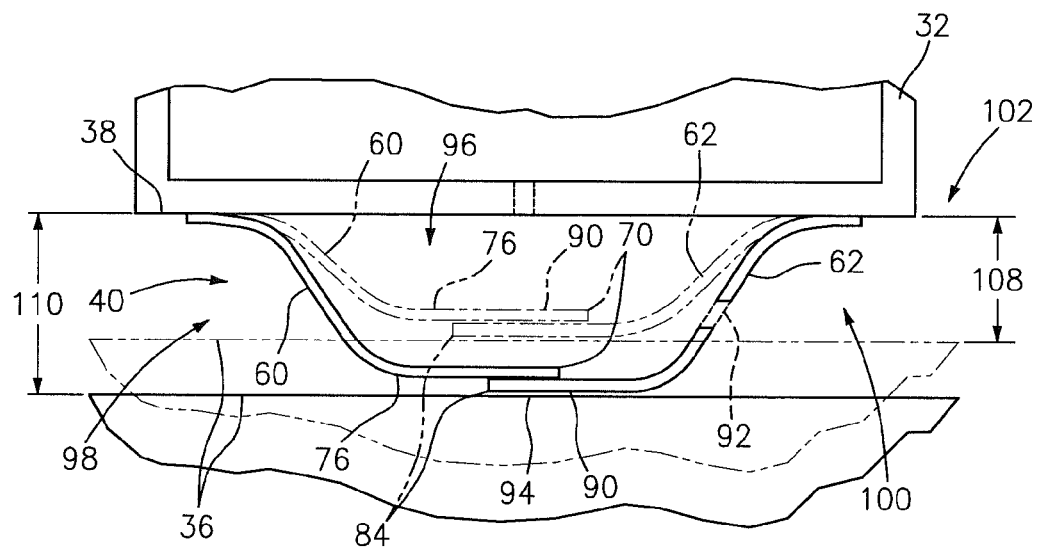
FIG. 7 is a cross-sectional illustration of the exhaust nozzle illustrated in FIG. 6.

Referring to FIG. 7, the relatively small portion of leaked core gas may flow through the second air gap 100 and the airflow apertures 92, and into the airflow channel 96. The leaked core gas within the airflow channel 96 may subject the seal 40 to a pressure force. The pressure force may push the first seal segment 76 against the second seal segment 90 and, thereby, push the second seal segment 90 against the respective seal land 94. The first element end 70 may slide laterally relative to (e.g., towards) the second element end 84 as the displacement between the exhaust nozzle duct sidewall 36 and the respective divergent flap sidewall 38 increases from the first displacement 108 to the second displacement 110. In this manner, each seal 40 may accommodate the non-uniform displacement between the respective exhaust nozzle duct sidewall 36 and divergent flap sidewall 38, and maintain a seal between the second seal segment 90 and the seal land 94.

In an alternate embodiment, the first thickness 64 may be greater than the second thickness 78. In another alternate embodiment, the first thickness 64 may be substantially equal to the second thickness 78.

In some embodiments, for example as illustrated in FIG. 5, each divergent flap sidewall 38 may include one or more airflow apertures 112 that provide cooling air to the airflow channel 96. In other embodiments, one or more airflow apertures may extend through the first transition segment 74. In still other embodiments, the airflow apertures (e.g., 92 and/or 112) may be omitted from the seal 40 and/or the divergent flap sidewalls 38.

In some embodiments, for example as illustrated in FIG. 5, first seal element 60 and/or the second seal element 62 may be geometrically configured to form the airflow channel 96 with a compound cross-sectional geometry. In other embodiments, the first seal element 60 and/or the second seal element 62 may be geometrically configured to form the airflow channel 96 with a curved cross-sectional geometry. The present invention, however, is not intended to be limited to any of the aforesaid airflow channel geometries.

In some embodiments, the first seal segment 76 and the second seal segment 90 may be sized and geometrically configured to preload the first seal segment 76 against the second seal segment 90 and/or the second seal segment 90 against the seal land 94.

In some embodiments, the seals may be connected to the exhaust nozzle duct sidewalls, and the second seal segments may respectively engage seal lands on the divergent flap sidewalls.

The channeled spring seals are described above and illustrated in the drawings as being included in a turbine engine exhaust nozzle. A person of ordinary skill in the art will recognize, however, that such a seal may be utilized to seal a gap between moving plates in a variety of different applications. The present invention therefore is not intended to be limited to turbine engine exhaust nozzle or turbine engine applications.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A sealed joint, comprising:
   a first plate comprising a seal land;
   a second plate that moves relative to the seal land; and
   a seal extending laterally between a first seal end and a second seal end, and comprising a plurality of seal elements that extend longitudinally between a first seal side and a second seal side;
   wherein a first of the plurality of seal elements extends laterally from the first seal end towards a first seal segment that is separated from the second plate by an airflow channel, and a second of the plurality of seal elements extends laterally from the second seal end towards a second seal segment that is located between and engaged with the first seal segment and the seal land; and
   wherein a first of the seal elements is riveted, braised or welded to the second plate.

2. The joint of claim 1, wherein
   the first of the plurality of seal elements further comprises a first base segment that extends laterally from the first seal end towards the first seal segment, and is connected to the second plate; and
   the second of the plurality of seal elements further comprises a second base segment that extends laterally from the second seal end towards the second seal segment, and is connected to the second plate.

3. The joint of claim 2, wherein the airflow channel extends laterally between the first base segment and the second base segment, and longitudinally between the first seal side and the second seal side.

4. The joint of claim 2, wherein
   the first of the plurality of seal elements further comprises a first transition segment that extends laterally between the first base segment and the first seal segment; and
   the second of the plurality of seal elements further comprises a second transition segment that extends laterally between the second base segment and the second seal segment.

5. The joint of claim 4, wherein one or more airflow apertures extend through the second transition segment, and are coupled with the airflow channel.

6. The joint of claim 1, wherein the first of the plurality of seal elements comprises a first thickness, and the second of the plurality of seal elements comprises a second thickness.

7. The joint of claim 6, wherein the second thickness is greater than the first thickness.

8. The joint of claim 1, wherein the second plate comprises one or more airflow apertures that are coupled with the airflow channel.

9. The joint of claim 1, wherein the first seal segment is preloaded against the second seal segment, and the second seal segment is preloaded against the seal land.

10. The joint of claim 1, wherein the first plate comprises a sidewall of a turbine engine exhaust nozzle case, and the second plate comprises a sidewall of a turbine engine exhaust nozzle flap.

11. A sealed joint, comprising:
    a first plate comprising a seal land;
    a second plate that moves relative to the seal land; and
    a seal extending laterally between a first seal end and a second seal end, and comprising
    a first seal element extending laterally from the first seal end to a first element end, and comprising a first base segment connected to and transversely contacting the second plate, and a first seal segment spatially separated from the second plate, wherein the first base segment extends laterally from the first seal end towards the first seal segment; and
    a second seal element extending laterally from the second seal end to a second element end, and comprising a second base segment connected to and transversely contacting the second plate, and a second seal segment located transversely between and engaged with the first seal segment and the seal land, wherein the second base segment extends laterally from the second seal end towards the second seal segment, and wherein the first and the second seal elements are discrete bodies.

12. The joint of claim 11, wherein an airflow channel is formed between the first seal segment and the second plate, and the airflow channel extends laterally between the first base segment and the second base segment, and longitudinally between a first seal side of the seal and a second seal side of the seal.

13. The joint of claim 11, wherein the first seal element extends longitudinally between a first seal side of the seal and a second seal side of the seal, and the second seal element extends longitudinally between the first seal side and the second seal side.

14. The joint of claim 11, wherein the first seal element comprises a first thickness, and the second seal element comprises a second thickness that is different than the first thickness.

15. The joint of claim 14, wherein the second thickness is greater than the first thickness.

16. The joint of claim 11, wherein
    the first seal element further comprises a first transition segment that extends laterally between the first base segment and the first seal segment; and
    the second seal element further comprises a second transition segment that extends laterally between the second base segment and the second seal segment.

17. The joint of claim 16, wherein one or more airflow apertures extend through the second transition segment, and are coupled with an airflow channel that is formed between the first seal segment and the second plate.

18. The joint of claim 11, wherein the second plate comprises one or more airflow apertures that are coupled with an airflow channel that is formed between the first seal segment and the second plate.

19. The joint of claim 11, wherein the first seal segment is preloaded against the second seal segment, and the second seal segment is preloaded against the seal land.

* * * * *